US010565860B1

(12) United States Patent
Omer et al.

(10) Patent No.: US 10,565,860 B1
(45) Date of Patent: Feb. 18, 2020

(54) OFFLINE TUNING SYSTEM FOR DETECTING NEW MOTION ZONES IN A MOTION DETECTION SYSTEM

(71) Applicant: Cognitive Systems Corp., Waterloo (CA)

(72) Inventors: Mohammad Omer, Waterloo (CA); Stephen Arnold Devison, Kitchener (CA)

(73) Assignee: Cognitive Systems Corp., Waterloo (CA)

( * ) Notice: Subject to any disclaimer, the term of this patent is extended or adjusted under 35 U.S.C. 154(b) by 0 days.

(21) Appl. No.: 16/360,250

(22) Filed: Mar. 21, 2019

(51) Int. Cl.
*G08B 29/24* (2006.01)
*G08B 13/196* (2006.01)

(52) U.S. Cl.
CPC ......... *G08B 29/24* (2013.01); *G08B 13/1968* (2013.01); *G08B 13/19652* (2013.01); *G08B 13/19684* (2013.01)

(58) Field of Classification Search
CPC .............. G08B 29/24; G08B 13/19652; G08B 13/1968; G08B 13/19684
See application file for complete search history.

(56) References Cited

U.S. PATENT DOCUMENTS

| | | | |
|---|---|---|---|
| 4,054,879 A | 10/1977 | Wright et al. |
| 4,649,388 A | 3/1987 | Atlas |
| 4,740,045 A | 4/1988 | Goodson et al. |
| 5,270,720 A | 12/1993 | Stove |
| 5,613,039 A | 3/1997 | Wang et al. |
| 5,696,514 A | 12/1997 | Nathanson et al. |
| 6,075,797 A | 6/2000 | Thomas |
| 6,380,882 B1 | 4/2002 | Hegnauer |
| 6,573,861 B1 | 6/2003 | Hommel et al. |
| 6,914,854 B1 | 7/2005 | Heberley et al. |

(Continued)

FOREIGN PATENT DOCUMENTS

| CA | 2834522 | 5/2014 |
|---|---|---|
| CA | 2945702 | 8/2015 |

(Continued)

OTHER PUBLICATIONS

Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.

(Continued)

*Primary Examiner* — Sisay Yacob
(74) *Attorney, Agent, or Firm* — Henry Patent Law Firm PLLC

(57) ABSTRACT

In a general aspect, an offline system detects new motion zones for a motion detection system. In some examples, observed channel response data is obtained from a motion detection system. The observed channel response data is associated with a plurality of subcarriers for each wireless link over a period of time. Estimated channel response data is generated for each wireless link. Transitions between zones of activity are identified in the estimated channel response data for each of the plurality of subcarriers for each wireless link. A new motion zone of the motion detection system is detected based on the estimated channel response data and the identified transitions.

24 Claims, 8 Drawing Sheets

(56) References Cited

U.S. PATENT DOCUMENTS

| | | |
|---|---|---|
| 7,652,617 B2 | 1/2010 | Kurtz et al. |
| 8,463,191 B2 | 6/2013 | Farajidana et al. |
| 8,660,578 B1 | 2/2014 | Yang et al. |
| 8,671,069 B2 | 3/2014 | Chang et al. |
| 8,710,984 B2 | 4/2014 | Wilson et al. |
| 8,812,654 B2 | 8/2014 | Gelvin et al. |
| 8,832,244 B2 | 9/2014 | Gelvin et al. |
| 8,836,344 B2 | 9/2014 | Habib et al. |
| 8,836,503 B2 | 9/2014 | Gelvin et al. |
| 9,030,321 B2 | 5/2015 | Breed |
| 9,253,592 B1 | 2/2016 | Moscovich et al. |
| 9,329,701 B2 | 5/2016 | Lautner |
| 9,523,760 B1 | 12/2016 | Kravets et al. |
| 9,524,628 B1* | 12/2016 | Omer ............... G08B 13/2491 |
| 9,551,784 B2 | 1/2017 | Katuri et al. |
| 9,584,974 B1 | 2/2017 | Omer et al. |
| 9,609,468 B1 | 3/2017 | Moscovich et al. |
| 9,628,365 B2 | 4/2017 | Gelvin et al. |
| 9,692,459 B2 | 6/2017 | Maltsev et al. |
| 9,743,294 B1 | 8/2017 | Omer et al. |
| 9,869,759 B2 | 1/2018 | Furuskog et al. |
| 9,927,519 B1 | 3/2018 | Omer et al. |
| 9,933,517 B1 | 4/2018 | Olekas et al. |
| 9,989,622 B1 | 6/2018 | Griesdorf et al. |
| 10,004,076 B1 | 6/2018 | Griesdorf et al. |
| 10,048,350 B1 | 8/2018 | Piao et al. |
| 10,051,414 B1 | 8/2018 | Omer et al. |
| 10,077,204 B2 | 9/2018 | Maschmeyer et al. |
| 10,108,903 B1 | 10/2018 | Piao et al. |
| 10,109,167 B1 | 10/2018 | Olekas et al. |
| 10,109,168 B1 | 10/2018 | Devison et al. |
| 10,111,228 B2 | 10/2018 | Griesdorf et al. |
| 10,129,853 B2 | 11/2018 | Manku et al. |
| 2003/0108119 A1 | 6/2003 | Mohebbi et al. |
| 2006/0152404 A1 | 7/2006 | Fullerton et al. |
| 2006/0217132 A1* | 9/2006 | Drummond-Murray ............. H04W 64/00 455/456.2 |
| 2006/0284757 A1 | 12/2006 | Zemany |
| 2007/0296571 A1 | 12/2007 | Kolen |
| 2008/0119130 A1 | 5/2008 | Sinha |
| 2008/0240008 A1 | 10/2008 | Backes et al. |
| 2008/0258907 A1 | 10/2008 | Kalpaxis |
| 2008/0303655 A1* | 12/2008 | Johnson ............... G01S 13/0209 340/539.16 |
| 2009/0062696 A1 | 3/2009 | Nathan et al. |
| 2009/0180444 A1 | 7/2009 | McManus et al. |
| 2010/0073686 A1 | 3/2010 | Medeiros et al. |
| 2010/0127853 A1 | 5/2010 | Hanson et al. |
| 2010/0130229 A1 | 5/2010 | Sridhara et al. |
| 2010/0306320 A1 | 12/2010 | Leppanen et al. |
| 2010/0315284 A1 | 12/2010 | Trizna et al. |
| 2011/0019587 A1 | 1/2011 | Wang |
| 2011/0035491 A1 | 2/2011 | Gelvin et al. |
| 2012/0115512 A1 | 5/2012 | Grainger et al. |
| 2012/0146788 A1* | 6/2012 | Wilson ............... G08B 13/187 340/539.23 |
| 2012/0184296 A1* | 7/2012 | Milosiu ............... G01S 11/06 455/456.1 |
| 2013/0017836 A1 | 1/2013 | Chang et al. |
| 2013/0090151 A1 | 4/2013 | Ngai et al. |
| 2013/0094538 A1 | 4/2013 | Wang |
| 2013/0113647 A1 | 5/2013 | Sentelle et al. |
| 2013/0162459 A1 | 6/2013 | Aharony et al. |
| 2013/0178231 A1 | 7/2013 | Morgan |
| 2013/0283256 A1 | 10/2013 | Proud |
| 2014/0135042 A1 | 5/2014 | Buchheim et al. |
| 2014/0148195 A1 | 5/2014 | Bassan-Eskenazi et al. |
| 2014/0247179 A1 | 9/2014 | Furuskog |
| 2014/0266669 A1 | 9/2014 | Fadell et al. |
| 2014/0274218 A1 | 9/2014 | Kadiwala et al. |
| 2014/0286380 A1 | 9/2014 | Prager et al. |
| 2014/0329540 A1 | 11/2014 | Duggan et al. |
| 2014/0355713 A1 | 12/2014 | Bao et al. |
| 2014/0361920 A1 | 12/2014 | Katuri et al. |
| 2015/0043377 A1 | 2/2015 | Cholas et al. |
| 2015/0063323 A1 | 3/2015 | Sadek et al. |
| 2015/0078295 A1 | 3/2015 | Mandyam et al. |
| 2015/0098377 A1 | 4/2015 | Amini et al. |
| 2015/0159100 A1 | 6/2015 | Shi et al. |
| 2015/0181388 A1 | 6/2015 | Smith |
| 2015/0195100 A1 | 7/2015 | Imes et al. |
| 2015/0212205 A1 | 7/2015 | Shpater |
| 2015/0245164 A1 | 8/2015 | Merrill |
| 2015/0309166 A1 | 10/2015 | Sentelle et al. |
| 2015/0312877 A1 | 10/2015 | Bhanage |
| 2015/0338507 A1 | 11/2015 | Oh et al. |
| 2015/0350849 A1 | 12/2015 | Huang et al. |
| 2016/0018508 A1* | 1/2016 | Chen ............... G01S 5/0252 455/456.1 |
| 2016/0088438 A1 | 3/2016 | O'Keeffe |
| 2016/0150418 A1 | 5/2016 | Kang et al. |
| 2016/0183059 A1 | 6/2016 | Nagy et al. |
| 2016/0187475 A1 | 6/2016 | Horng et al. |
| 2016/0210838 A1 | 7/2016 | Yan et al. |
| 2016/0262355 A1 | 9/2016 | Swan |
| 2017/0042488 A1 | 2/2017 | Muhsin |
| 2017/0052247 A1 | 2/2017 | Kong et al. |
| 2017/0055126 A1 | 2/2017 | O'Keeffe |
| 2017/0055131 A1 | 2/2017 | Kong et al. |
| 2017/0059190 A1 | 3/2017 | Stefanski et al. |
| 2017/0086281 A1 | 3/2017 | Avrahamy |
| 2017/0090026 A1 | 3/2017 | Joshi et al. |
| 2017/0111852 A1 | 4/2017 | Selen et al. |
| 2017/0126488 A1 | 5/2017 | Cordeiro et al. |
| 2017/0146656 A1 | 5/2017 | Belsley et al. |
| 2017/0155439 A1 | 6/2017 | Chang et al. |
| 2017/0195893 A1 | 7/2017 | Lee et al. |
| 2017/0223628 A1 | 8/2017 | Snyder et al. |
| 2017/0278374 A1 | 9/2017 | Skaaksrud |
| 2017/0280351 A1 | 9/2017 | Skaaksrud |
| 2017/0311279 A1 | 10/2017 | Allegue Martinez et al. |
| 2017/0311574 A1 | 11/2017 | Swan |
| 2017/0343658 A1 | 11/2017 | Ramirez et al. |
| 2018/0027389 A1 | 1/2018 | Shirakata et al. |
| 2018/0086264 A1 | 3/2018 | Pedersen |
| 2018/0106885 A1 | 4/2018 | Blayvas |
| 2018/0180706 A1 | 6/2018 | Li et al. |
| 2018/0288587 A1 | 10/2018 | Allegue Martinez et al. |

FOREIGN PATENT DOCUMENTS

| | | |
|---|---|---|
| JP | 1997-507298 | 7/1997 |
| JP | 2004286567 | 10/2004 |
| JP | 2013072865 | 4/2013 |
| WO | 2014/021574 | 2/2014 |
| WO | 2014/201574 | 12/2014 |
| WO | 2015/168700 | 11/2015 |
| WO | 2016005977 | 1/2016 |
| WO | 2016/066822 | 5/2016 |
| WO | 2016/110844 | 7/2016 |
| WO | 2017/106976 | 6/2017 |
| WO | 2017/132765 | 8/2017 |
| WO | 2017177303 | 10/2017 |
| WO | 2017/210770 | 12/2017 |
| WO | 2018/094502 | 5/2018 |
| WO | 2019041019 | 3/2019 |

OTHER PUBLICATIONS

Domenico, et al., "Exploring Training Options for RF Sensing Using CSI", IEEE Communications Magazine, 2018, vol. 56, Issue 5, pp. 116-123, 8 pgs.

Iqbal, et al., "Indoor Motion Classification Using Passive RF Sensing Incorporating Deep Learning", ISSN: 2577-2465, Electronic IEEE, Jun. 3, 2018, 5 pgs.

Kosba, et al., "Robust WLAN Device-free Passive Motion Detection", IEEE Wireless Communications and Networking Conference, Apr. 2012, 6 pgs.

Youssef, Moustafa, et al., "Challenges: Device-free Passive Localization for Wireless Environments", Mobicom 07 Proceedings of

(56) References Cited

OTHER PUBLICATIONS the 13th Annual ACM International Conference on Mobile Computing and Networking, Sep. 2007, 11 pgs.

\* cited by examiner

OFFLINE TUNING SYSTEM FOR DETECTING NEW MOTION ZONES IN A MOTION DETECTION SYSTEM

BACKGROUND

The following description relates to motion detection.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DETAILED DESCRIPTION

In some aspects of what is described, new motion zones of a motion detection system are identified. A motion zone is an area of a space in which motion may be detected and associated with a certain location in the space. A zone may be a particular room or combination of rooms or areas in the space. A space may be, for example, a house, business, or other type of building. A motion detection system may be initially trained to associate detected motion with certain motion zones, which are sometimes determined by the user performing a supervised training of the system. For example, when a motion detection system is installed in a space, e.g., a house or business, the system may be trained for the particular space. For example, a user may be directed to walk through certain areas, e.g., motion zones, of the space while performing certain movements. This type of training is referred to as supervised training. During the supervised training, the motion detection system records readings of motion from each of the motion zones. In some cases, the user provides corresponding labels for each motion zone, e.g., kitchen, living room, bedroom, etc. However, the supervised training can be time consuming and tedious for the user, and users may be averse to perform explicit training of the system. Asking the users to walk in different zones, and label each zone, e.g., via a mobile application, is a cumbersome process, and is prone to user mistakes. Further, the user may be asked to perform supervised periodic re-training, e.g., when the space is reorganized or to adjust to updated motion algorithms. In some cases, periodic training of the system to automatically identify new or changed motion zones, requiring minimal user involvement, is desired.

The systems and techniques described here may provide one or more advantages in some instances. For example, the accuracy of motion sensing and detection and of localization of the motion within the space served by the motion detection system may be improved. Additionally, identification of new motion zones can be performed off-line without impacting the operation of the motion detection system and without user supervision.

Figure 1:
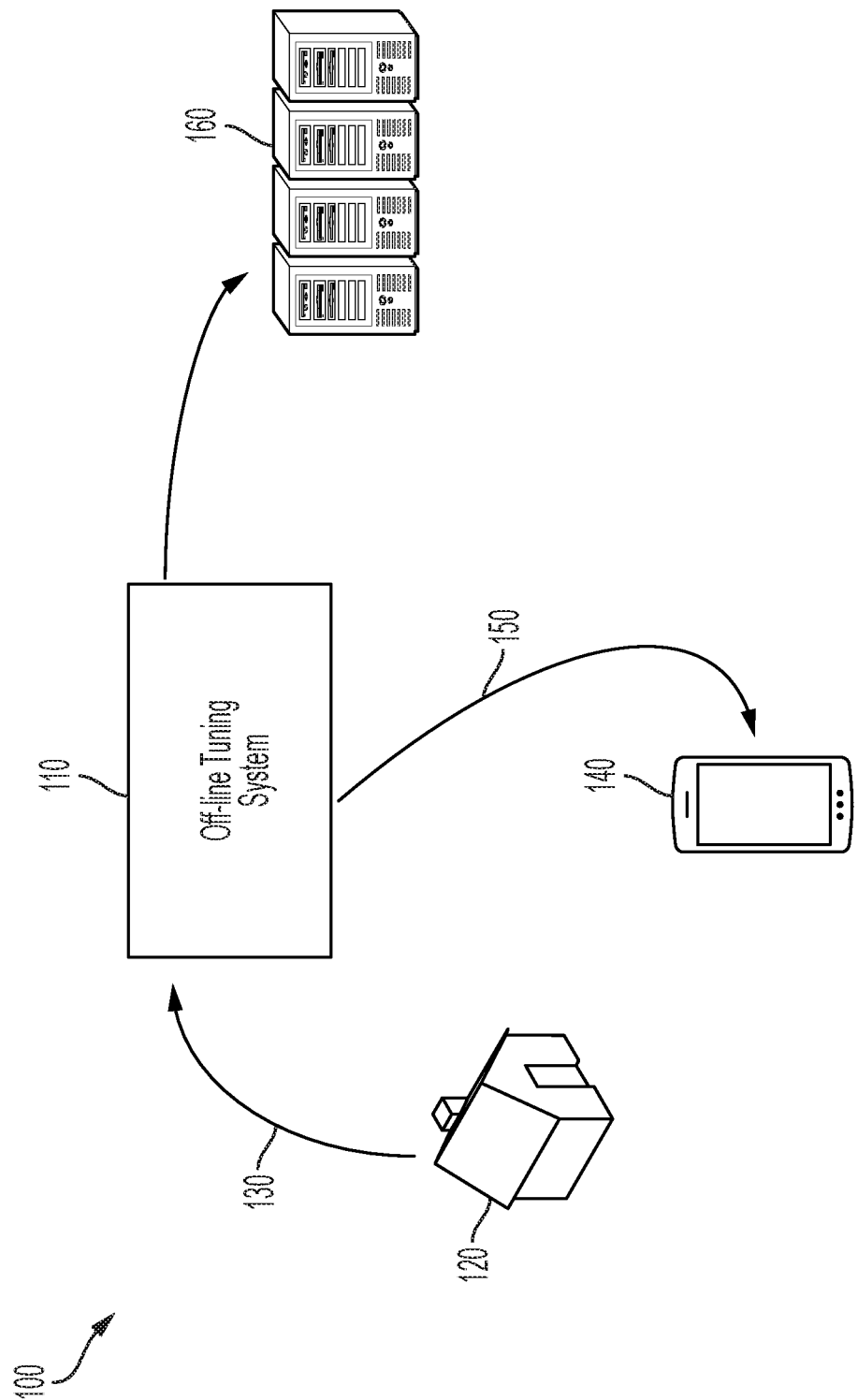
FIG. 1 is a block diagram showing an example offline tuning system.

FIG. 1 is a block diagram showing an example offline tuning environment 100. In the example offline tuning environment, an offline tuning system 110 interfaces with a motion detection system 120, an application running a user device 140, and a machine learning system 160. In an implementation, the motion detection system 120 is operating and providing motion and localization information in the home (or another type of space) to its users. The offline tuning system 110 and the machine learning system 160 can be implemented on any appropriate computer system such as, for example, any type of computer, server or server cluster, distributed computing system, or other computing resource. In some cases, the offline tuning system 110 and the machine learning system 160 operate in a cloud environment (e.g., remote from the motion detection system); or in some cases, one or both of them may operate in a location or network environment associated with the motion detection system 120 or the user device 140.

The motion detection system 120 may use motion detection techniques to detect motion (or no-motion, presence, etc.) of objects in a space. The motion detection system 120 may also use localization techniques to pinpoint the location of an object in the space, for example, to a particular node of the system. In the example shown in FIG. 1, the motion detection system 120 uses wireless signals to detect motion of objects in a home or another type of space. The space accessed by the wireless signals can be an indoor or outdoor space, which may include, for example, one or more fully or partially enclosed areas, an open area without enclosure, etc. The space can be or can include an interior of a room, multiple rooms, a building, or the like. Based on the wireless signals (e.g., based on channel response information obtained from the wireless signals, or other types of channel state information), the motion detection system 120 may, in some instances, detect movement, presence or location of an object in the space. The object can be any type of static or moveable object, and can be living or inanimate. For example, the object can be a human, an animal, an inorganic object, or another device, apparatus, or assembly), an object that defines all or part of the boundary of a space, or another type of object.

In some instances, wireless signals received at each of the wireless communication devices in the motion detection system 120 may be analyzed to determine channel response information for the wireless links in the network (e.g. between respective pairs of wireless communication devices in the network). The channel response information may be representative of a physical medium that applies a transfer function to wireless signals that traverse the space. In some instances, the channel response information includes channel properties of a wireless link, and may describe how a wireless signal propagates from a transmitter to a receiver, representing the combined effect of, for example, scattering, fading, and power decay within the space between the transmitter and receiver. In some instances, the channel response information includes beamforming state information used in multi antenna (multiple-input/multiple-output (MIMO)) radio systems for directional signal transmission or reception.

Example motion detection and localization algorithms that can be used to detect motion based on wireless signals include the techniques described in U.S. Pat. No. 9,523,760 entitled "Detecting Motion Based on Repeated Wireless Transmissions," U.S. Pat. No. 9,584,974 entitled "Detecting Motion Based on Reference Signal Transmissions," U.S. Pat. No. 10,051,414 entitled "Detecting Motion Based On Decompositions Of Channel Response Variations," U.S. Pat. No. 10,048,350 entitled "Motion Detection Based on Groupings of Statistical Parameters of Wireless Signals," U.S. Pat. No. 10,108,903 entitled "Motion Detection Based on Machine Learning of Wireless Signal Properties," U.S. Pat. No. 10,109,167 entitled "Motion Localization in a Wireless Mesh Network Based on Motion Indicator Values," U.S. Pat. No. 10,109,168 entitled "Motion Localization Based on Channel Response Characteristics," and other techniques.

In some cases, the offline tuning system 110 automatically performs a periodic re-training of the motion detection system 120 to capture environmental changes to the space, e.g., movement of furniture, installation/removal of ceiling fans, remodeling, etc., that cause changes to the multipath environment in the home. The re-training may also be used to take account of improvements in the detection, localization, and machine learning algorithms utilized by motion detection system 120. In these cases, the offline tuning process may be implemented without requiring active user participation for training purposes.

In an implementation, the offline tuning process also automatically identifies new motion zones in the space. For example, the offline tuning environment may identify and segment motion activity that can be associated with various zones of the space in which the motion detection system 120 is operating.

In some instances, each time a calibration event runs, e.g., each night, the offline tuning system 110 takes in the observed channel data 130 from the motion detection system 120 and determines a motion zone delineation. As illustrated in FIG. 1, the offline tuning system 110 receives actual observed data 130 from the motion detection system 120. The offline tuning system 110 processes the received data offline, that is, separate from the motion detection system 120 processing the data to detect motion. The channel data 130 may be received and processed periodically at certain intervals, such as daily, every few days, or weekends only. In some cases, the interval may be configurable by the user. For example, when the system is initially installed, offline tuning of the system may be performed daily. After time, the interval may be adjusted so that the offline tuning is performed less regularly, e.g., weekly, bi-weekly, monthly, etc. In some instances, the offline tuning system 110 receives data during hours when the least motion is occurring, e.g., between midnight and 3 a.m. In some instances, the data 130 is processed when the offline tuning system 110 identifies activity in a certain portion of the receive data 130.

In the beginning, the motion detection system 120 may only be capable of localizing motion to the vicinity of an installed node. For example, each node used for motion detection can be implemented as a wireless communication device (e.g., a radio frequency (RF) device), which may carry a software stack for motion detection. In some instances, the wireless communication device is part of the motion detection system 120. Initially, the number of zones available to the system, and known to the user, are limited by the number of nodes in the motion detection system 120. In an example, on installation, two nodes may be installed, e.g., one node in the kitchen and another node in the living room. The offline tuning system 110 operates to pull channel data 130 captured by the motion detection system 120, to identify a number of motion zones by analyzing the data, and identifying additional motion zones from the data. In some instances, additional zones improve accuracy of motion detection and localization of the motion.

In some instances, the offline tuning system 110 operates in a semi-supervised mode to elicit human assistance and input from the user in order to accurately name newly identified zones. However, it is not necessary for the user to perform a supervised training process to identify the new zones. For example, in some instances, the offline tuning system 110 identifies zone segments and their times of occurrence offline, and involves the user only when a change in configuration or a new unlabeled zone is identified. By processing independently of the user, the system performs iterations over time, each time improving the quantitative performance (which refers to the accuracy of the derived information) and qualitative performance (which refers to the relevance of the information provided to the user, e.g., location of motion), of the motion detection system 120.

In some instances, the user is prompted for feedback by sending a message 150 via a user interface of a motion detection application on the user device 140, e.g., smartphone, personal digital assistance, personal computer, laptop, or other device. In some instances, the message reminds the user that at a certain time of the day, motion was detected in an unmarked zone, and further queries whether the user would be interested in giving that unmarked zone a name, such as 'front corridor', 'deck' etc. In some cases, occasional, iterative participation of the user in naming new identified zones means that no explicit training is required on the part of the user when they start the motion detection system 120. Rather, the system can simply improve slowly over the deployment time.

In some implementations, delineation of a new motion zone by the offline tuning system 110 may be used as input to further train a machine learning system 160 of the motion detection system 120. For example, the machine learning system 160 may use the new motion zone and other existing motion zones to train the motion detection system to differentiate motion occurring in and between the different motion zones, including the new motion zone, and to localize motion to one of the motion zones in the space. In some instances, the machine learning system 160 provides a model for mapping instantaneous (or near instantaneous, e.g., over a short time window) observations of the channel response data to a zone identity (including the new zone identified by the offline tuning system 110) so that the motion detection system will be able to detect user activity in real time. In some implementations, the machine learning model operates as a supervised process in which the model is explicitly provided the zone identities for which it has to match the observed channel response data. The zone identifiers may be made available from the offline tuning system 110 which, along with the semi-supervised human intervention, may determine the actual zones and their occupancy intervals in the data set.

In some instances, additional processes may be performed in the cloud based on the results of the offline tuning system 110 in order to make new zones available to motion detection system 120 and a user device 140. For example, once the machine learning model is trained using the supervised data set, the model output can be provided to a classifier which operates as a forward part of the machine learning model 160. In some instances, the classifier is the process that creates the actual zone categories based on observed channel data, while the machine learning model has a feedback loop to train the parameters of the classifier. In some instances, once the classifier is complete, it can be transmitted 150 (e.g., overnight or at other times) to a user device 140 as an embedded system service update so that motion detection predictions can be instantly available to the user. In some instances, the classifier can continue to be run as a cloud service informing the user of their activities with a slightly higher latency than running on the device.

In some instances, when the offline tuning system 110 identifies a new motion zone, the motion detection system 120 is updated so that it can identify motion or presence of objects in the new motion zone. For instance, the offline tuning system 110 may provide distribution parameters or other types of data that the motion detection system 120 can use to identify motion occurring in the new motion based on wireless signals collected by the motion detection system. As another example, the offline tuning system 110 may provide motion zone labels or other types of information that allow the motion detection system 120 to provide meaningful output to other systems. For instance, the motion zone labels may be used to inform a user, a security system, a power management system or other entity where motion is occurring in the home (or other space) that is being monitored by the motion detection system 120.

In some implementations, the offline tuning system 110 or the machine learning system 160 (or both) operate as a hosted service that supports motion detection systems 120 in many disparate locations. In other words, the offline tuning system 110 and the machine learning system 160 are not necessarily dedicated to any individual motion detection system 120. Instead, the offline tuning system 110 and the machine learning system 160 may receive input data from, and provide output data to, multiple different systems and users.

Figure 2:
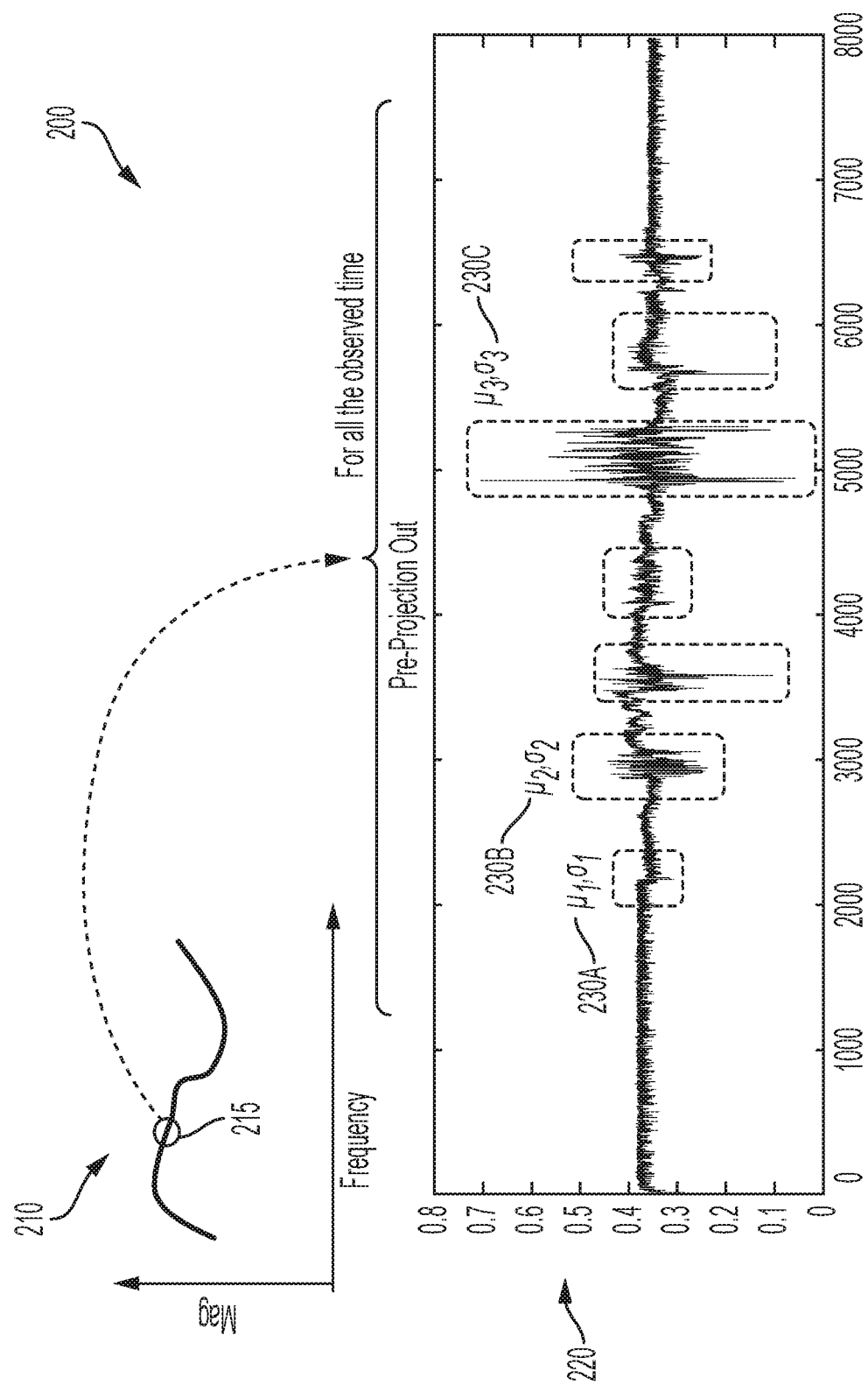
FIG. 2 is a diagram showing example time series for a subcarrier.

FIG. 2 is a diagram showing example times series for a subcarrier. This example illustrates the type of observed data 130 that may be received from the motion detection system 120 and interpreted through the offline tuning system 110. For instance, the motion detection system 120 may collect channel response data 210 during the motion detection process. In some cases, the channel response data 210 spans over several sub-carriers as illustrated by the x-axis. Here, the channel response data 210 shows a snapshot of the magnitude (vertical axis) of a wireless signal over a frequency range (horizontal axis); the frequency range shown in the plot includes a plurality of sub-carriers, with each subcarrier representing a distinct frequency component of the wireless signal. In the example shown, the offline tuning system selects a subcarrier 215 from the total channel response for analysis. An example plot in FIG. 2 shows the selected subcarrier's time series 220 over an observed time provided by the motion detection system 120. In the plot showing the time series 220, the horizontal axis shows the sample time line (sampled at a rate of one sample per 0.1 seconds); and the vertical axis shows the magnitude of the channel response data for the selected subcarrier at each sampled time point. The channel response value is generally a complex value, and the magnitudes of the complex values are shown in the time series 220.

In the example shown in FIG. 2, the offline tuning system 110 identifies certain segments 230 of the time series 220 where motion activity is indicated by a disturbance in the signal. Each identified segment 230 of the time series is labelled with a unique distribution that can be characterized by statistical parameters (e.g., a Gaussian distribution characterized by a mean $\mu$ and standard deviation $a$) which corresponds to a unique zone of activity. In this example, the time series 220 is taken from example channel response data 130 obtained by the motion detection system 120 wherein the user is walking in different motion zones of the space. As illustrated, the time series 220 shows that different spatial zones in the home (or other space) have different time signatures and amplitude distributions, e.g., $\mu_1$, $\sigma_1$ 230A, $\mu_2$, $\sigma_2$ 230B, $\mu_3$, $\sigma_3$ 230C, referred to herein as zone distributions, and which each represents a unique zone of activity. In some instances, by using the zone distribution information, the offline tuning system 110 can generate a model of a zone with a unique distribution whose parameters may be learned, and then use the model to detect those zones in the time series. In FIG. 2, each of the zone distributions 230A, 230B, 230C, corresponding to unique zones of activity, are denoted by parameters of a Gaussian distribution (mean $\mu$ and standard deviation $a$). However, other types of distributions and appropriate parameters may be used, and may be any arbitrary distribution, for example, based on the analysis of data or models. Regardless of the distribution applied, FIG. 2 illustrates that activity in each zone maps to a characteristic distribution 230, and the offline tuning system 110 can learn that distribution to know when activity in a certain motion zone is happening.

Figure 3:
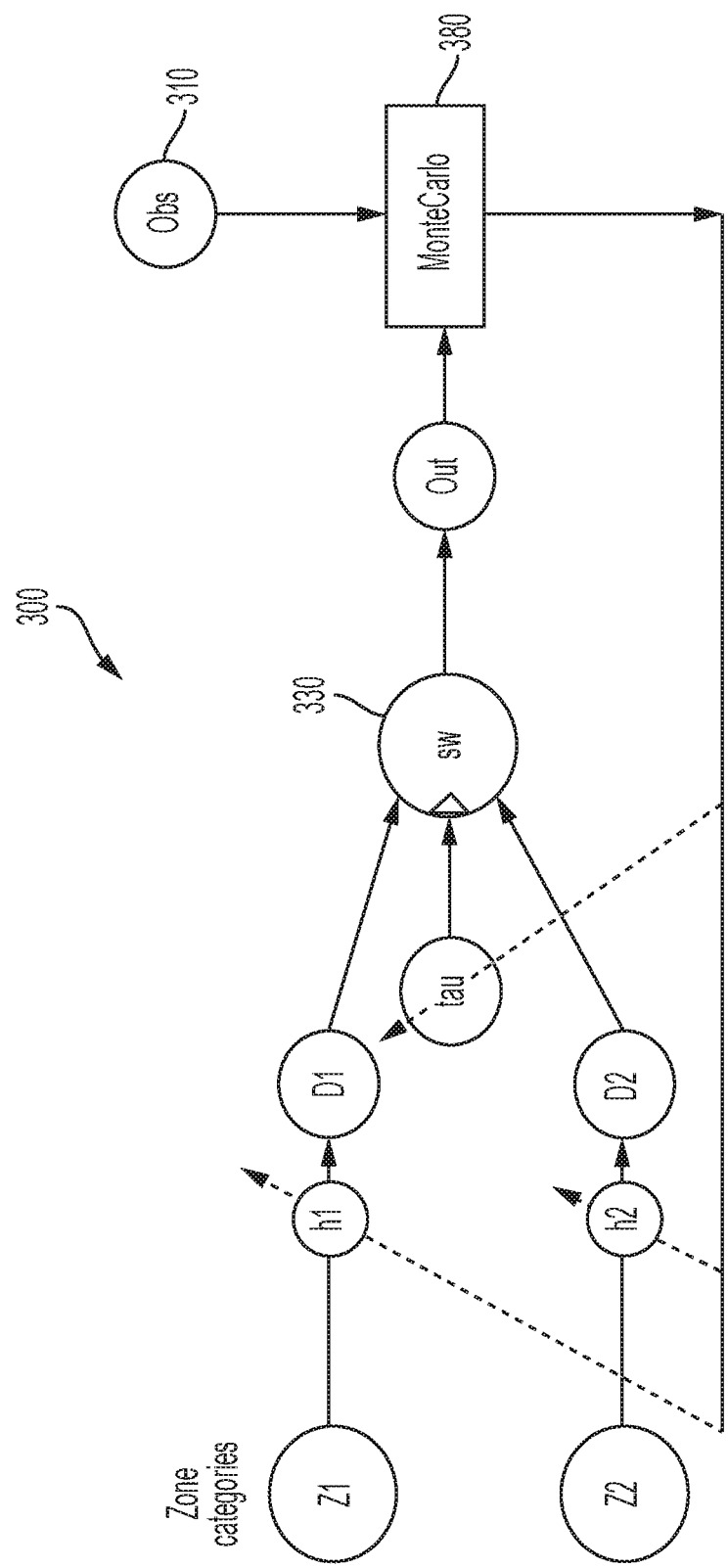
FIG. 3 is a diagram showing an example adaptive model for identifying new zones of activity.

FIG. 3 is a diagram showing an example adaptive model 300 used by the offline tuning system to identify new motion zones. The adaptive model 300 can be executed by a computer system that receives data generated by a motion detection system. For instance, the adaptive model 300 may be executed by the offline tuning system 110 shown in FIG. 1 or by another type of computer system.

In some instances, the offline tuning system will operate on the observed channel response data 310 collected from a motion detection system during the course of the day (e.g., as shown in FIG. 1). In an implementation, the offline tuning system comprises a random generator, seeded in a certain way, to generate a time series that mimics the one from the collected data for a particular subcarrier. In this example, it is initially assumed there are only two motion zones Z1, Z2. The initial number of motion zones Z generated by the model 300 may be the number of zones that are set up during installation and initialization of the motion detection system in the space. For example, the motion detection system may comprise two nodes placed in different areas of the home, and each node initially represents a motion zone. In some cases, motion is localized to the node associated with the motion zone. In some instances, the adaptive model 300 allows detection of additional motion zones without additional equipment.

Each modeled motion zone Z1, Z2 is associated with a hyper-parameter h1, h2 which represents the characteristic moments of a distribution. In an implementation, a random generator generates for a particular motion zone Z1, Z2 a corresponding model distribution D1, D2 representing activity in the motion zone, given by its corresponding hyper-parameters h1, h2, representing the specific distribution. In some instances, the model 300 applies another stochastic variable tau representing a time coordinate. In some cases, tau is a time vector comprising a number of time values. In an implementation, tau is used to determine switching times between motion zones. The switching times are time points when motion is determined to be transitioning between two motion zones. For example, a user walking may leave one motion zone and enter another motion zone. The time vector tau indicates the time points when switching happen between the motion zones, e.g., from Z2 to Z1, back and forth through-out the time series.

In the example model 300, both of the modeled distributions D1 and D2 and tau are fed as inputs into a switch 330. The output of the switch 330 is controlled by tau. For example, the switch lets either distribution D1 or D2 to flow through it, based on the value and identity of tau. In some instances, when one of the distributions D1, D2 is routed to the output of the switch 330 based on values of tau, the output distribution is one that is observed to be active in a time period for that tau, that is, the modeled data matches a distribution D1 or D2 at a time period designated by tau. In some instances, the active distribution at times indicated by tau indicates movement associated with the active distribution. In some implementations, the output distribution produced by the switch 330 represents estimated channel response data that is fed as input to a Monte Carlo engine 380. As shown, the Monte Carlo engine 380 is also supplied with the observed channel response data 310 from the motion detection environment, e.g., the home (or other space) in which the motion detection system 120 is operating, over the entire day. In some cases, the Monte Carlo engine 380 processes the observed and estimated data, and adapts the parameters of the stochastic model so that the generated random data agrees with the observed data to an acceptable degree. For example, the data may be adapted to move in a direction of gradient descent for error minimization. In some cases, if the estimated data can be made to agree with the observed data by adaptation, then the offline tuning system may determine that the parameters of the different distributions, e.g., D1, D2, used to model the data are statistically accurate. In some implementations, the Monte Carlo engine 380 continuously adapts the parameters of each distribution as it evaluates the observed data, tunes the parameters, regenerates the data, measures likeness to the observed data, and repeats this procedure.

When the Monte Carlo engine 380 shows convergent properties, such as when estimated parameters (e.g., h1, h2) remain stable from one iteration to the next, the offline tuning system can stop the model and examine the distributions for new motion zones. In some cases, an examination of tau may show which time instants are most likely to have triggered changes from one distribution to a different distribution (e.g., another motion zone). For example, using the tau values and the unique distribution between each tau, the offline tuning system can determine the instances at which the moving object shifted to a different motion zone. In some cases, using the distribution for each zone of activity, the offline tuning system may determine how distinct the two zones of activity are. For example, if the zones of activity are sufficiently separate (e.g., their characteristic distributions are sufficiently distinctive from each other), a new motion zone with a particular distribution may identified. In some instances, the offline tuning system may prompt a user (e.g., by providing a notification through an interface of a user device) that movement was detected in a unique motion zone and ask whether the user would like to label that zone for better location and motion tracking accuracy.

Figure 4:
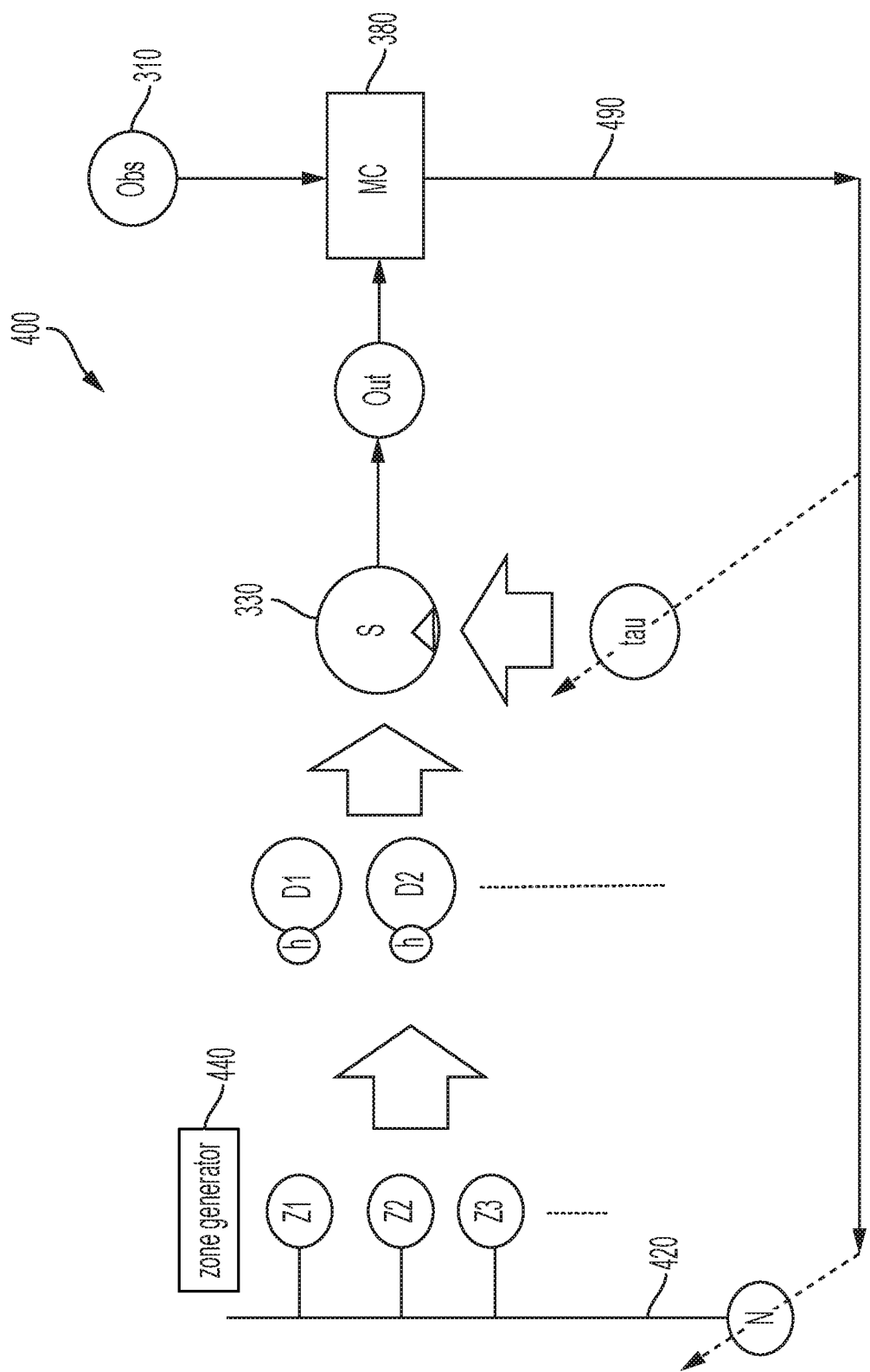
FIG. 4 is a diagram showing an example of updating hyperparameters in the adaptive model.

FIG. 4 is a block diagram showing an example process 400 for updating hyperparameters in the adaptive model 300 shown in FIG. 3. The process 400 can be executed, for example, by the computer system that executes the adaptive model 300 shown in FIG. 3. In this example process 400, all the components of the stochastic model that may be tuned by the Monte Carlo engine 380 are shown. For example, a branch 420 comprising N number of motion zones Z (e.g., Z1, Z2, Z3) is shown. The N number of motion zone is a hyper-parameter, which means that N number of motion zones is not fixed and may be adapted when new motion zones are detected. Thus, the N number of motion zones is a stochastic variable which may be tuned by the Monte Carlo engine 380. In some instances, this allows the Monte Carlo engine 380 the flexibility of adapting the number of independent motion zones in the model, and also allows the Monte Carlo engine 380 to define newer motion zones as the configurations and arrangements of the home (or other space) are updated, for example, by the user. In some instances, each time an update in the home occurs, the performance of instantaneous localizer algorithms which detect motion and the location of the motion, may operate with reduced accuracy until the adaptive model 300 is run during the offline tuning process, e.g., during a periodic (e.g., daily) update process. At that time, new motion zones can be identified and the user may be prompted to confirm the motion zones.

In some instances, one or more random zone generators 440, each representing one or more motion zones, are used to seed the distinct distributions D, each of which are associated with some hyper-parameters h attached to them. In some implementations, the seeded distributions generate random samples of output from each generator 440. These random samples start producing the estimated channel response data. The switch 330 uses tau to determine the output distribution, as described in FIG. 3. In an implementation, the estimated channel response data is eventually compared with the actual channel response data, e.g., observed channel response data 310. As shown in FIG. 4, these two sets of data are used as input to train the adaptive model 300 through the Monte Carlo engine 380. The output of the Monte Carlo engine 380 provides the effective number of motion zones N, the unique distribution for each motion zone, e.g., $\mu_N$, $\sigma_N$, and the switching times tau associated with when a transition to that particular motion zone occurred. In some cases, the data output 490 from the Monte Carlo engine 380 is fed back to the random generators to seed the generation of random distribution data. As described above, this adaptive model is repeated until the modeled data converges with the actual observed channel response data 410 after a particular iteration.

Figure 5:
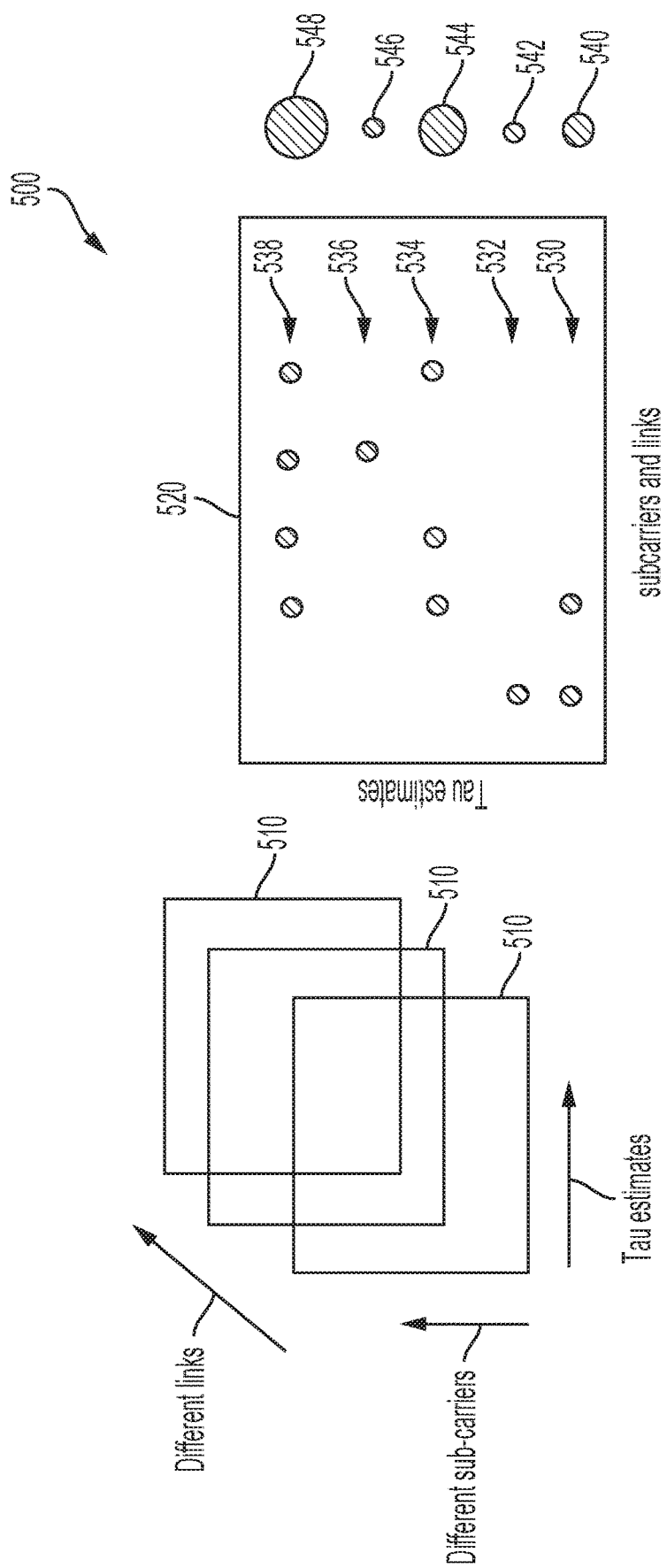
FIG. 5 is a diagram showing an example aggregation of link data.

FIG. 5 is a diagram showing an example process 500 of aggregating link data. In some instances, the adaptive model 300 described in FIGS. 3 and 4, can be run for each subcarrier (e.g., subcarrier 215 in FIG. 2) of the channel response data (e.g., channel response data 210 in FIG. 2). In some cases, each subcarrier 215 represents how a single frequency in the signal is affected, in amplitude and phase, by the changes in the channel, e.g., caused by human motion or other types of motion in the space. In some implementations, the channel response data 210 is computed over many subcarriers. For example, in the WiFi 802.11a standard, each 20 MHz portion of spectrum comprises 52 effective subcarriers, which may all be used in computing the channel response data. Each of these subcarriers may be separately input into and modeled by the Monte Carlo engine 380 which then creates different zone distributions D and transition time estimates tau, based on each of the individual subcarriers.

In some implementations, each transceiver operating in a MIMO system has many different transmission/reception paths, in which each transmitter/receiver (Tx/Rx) pair may be referred to as a link in a MIMO system. In MIMO systems, each transmit antenna and each receive antenna in the MIMO system computes a channel response over the entire range of subcarriers for that link. In some instances, because subcarriers from each Tx/Rx pair can be utilized in the Monte Carlo simulation, many Monte Carlo simulations may be launched in parallel. For example, a Monte Carlo simulation may be run based on each subcarrier within a link for a Tx/Rx pair, and each of these simulations may output an estimate of zone transition times. In some implementations, the aggregate of the outputs for each subcarrier and, in some instances, each link, can be used to form a decision on the final transition times, e.g., between two different motion zones.

The example process 500 in FIG. 5 illustrates a clustering mechanism to improve detection accuracy and reliability of transition times. For example, in some instances, a Monte Carlo simulation will generate a tau grid 510 for every subcarrier of each different link. This is illustrated in FIG. 5 as a cascade of squares on which the x axis represent the zone-transition estimates tau (for example, a spike on time-axis wherever a zone transition was inferred), and each individual square represents the channel estimation over a separate Tx/Rx link of a MIMO system. In the illustration, the 3D structure of the tau grids 510 for each link are collapsed to a 2D shape 520, where the tau (or time) dimension remains the same, but data for subcarriers and links has been flattened. In other words, the tau estimates of all subcarriers within a link are collected and lined up with the tau estimates of all subcarriers in another link until all links have been exhausted. In some cases, this aggregation process produces data to allow a type of voting across the subcarriers and across the links. For example, referring to diagram 520, starting from the bottom and going up, it is observed that the first transition estimate 530 is signaled by two subcarriers (from all subcarriers from all links). In this first transition, two votes are collected, which in this example, are represented by a circle with a bigger diameter 540. Similarly, the next transition estimate 532 is signaled only by a single subcarrier and the subsequent transition estimate 534 is signaled by 3 subcarriers, transition estimate 536 is signaled by one subcarrier, and transition estimate 538 is signaled four subcarriers, respectively. Each of these transition estimates lead to a circle of a different weight, e.g., 542, 544, 546, 548, based on the number of subcarriers that signal a transition. In some instances, based on the weights (represented by the diameters of the circles 540, 542, 544, 546, 548 in FIG. 5), the offline tuning system picks a number K of transitions from the data. In some implementations, the system picks the heaviest weighted K transition points (e.g., the ones with the most votes) and these transition points will be used to inform motion zone transitions and new motion zones.

Figure 8:
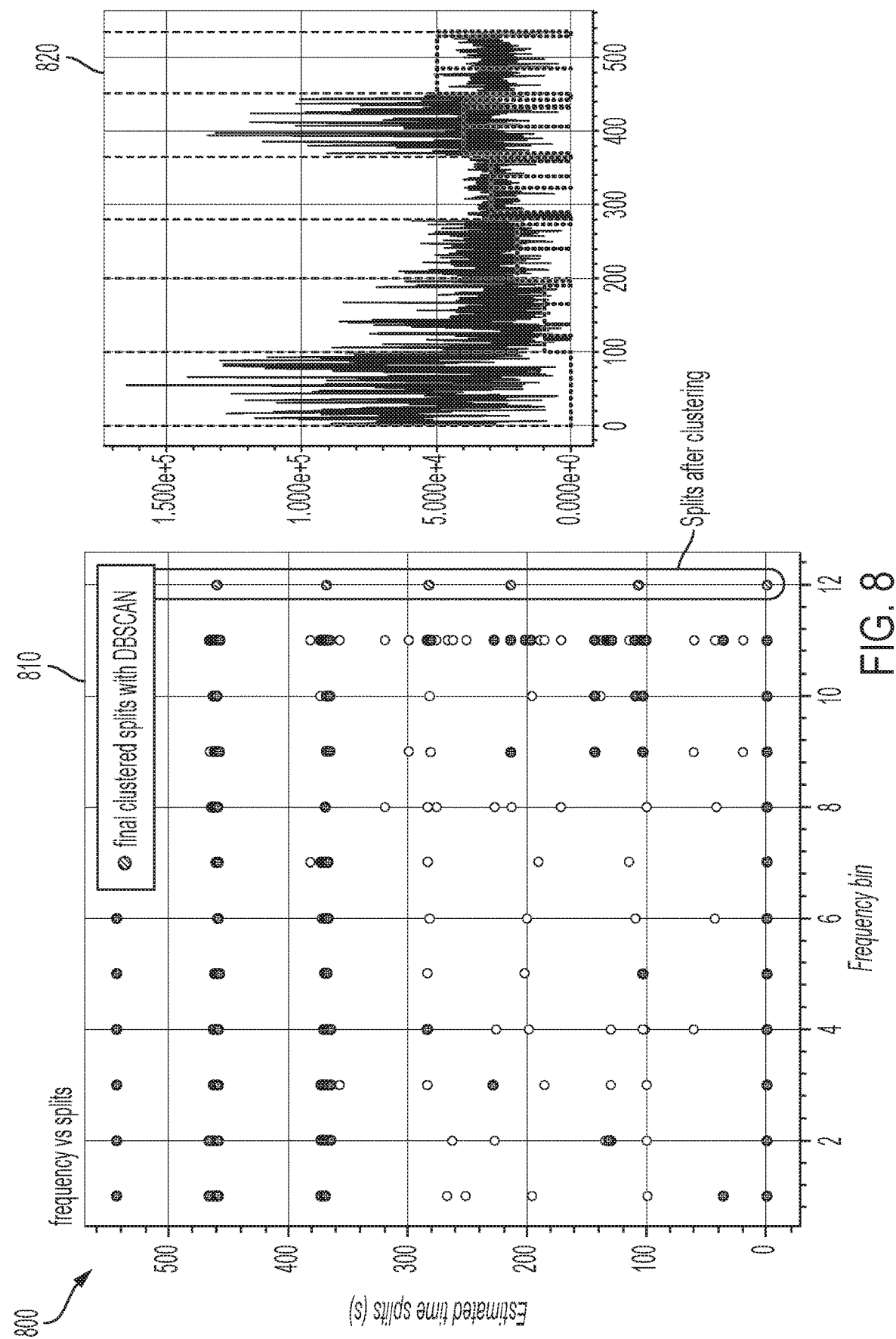
FIG. 8 shows the output from actual experiments conducted using an example offline training system.

FIG. 8 shows example output 800 from actual experiments conducted using an example implementation of the offline training system described above. This example output 800 was generated according to the process described in FIG. 5. As shown in plot 810, the vertical axis corresponds to the estimated time splits (e.g., indicated by tau) determined by a Monte Carlo engine (e.g., Monte Carlo engine 380). The horizontal axis represents each subcarrier frequency for which estimated channel response data was generated. Each subcarrier's time series (e.g., time series 220 for subcarrier 215 as shown in FIG. 2) is input to the Monte Carlo simulation (e.g., in the adaptive model 300 shown in FIG. 3) which estimates the transition points based on the subcarrier's aggregate changes. Once all the subcarriers have been processed, the estimated transition times (the "estimated time splits" in FIG. 2) from each subcarrier are collected together and passed through a 1-dimensional clustering algorithm, thereby flattening the data for multiple subcarriers and multiple links (e.g., as described in FIG. 5).

In this example, the clustering algorithm collects all points along the tau axis and finds the biggest clusters, and the biggest clusters are then considered as valid transition points between zones. The plot 820 illustrates the channel response from one of the subcarriers in the data. Along with the channel response data, the solid horizontal lines in the plot 820 represent zone locations marked by the user, and the dashed vertical lines show the zone transition instances discovered by the offline tuning system. In this example, the results show that the human-marked transition points (where the solid horizontal line steps up to indicate a new zone location) and the machine-labeled transition points (represented by the dashed vertical lines) agree to a high accuracy.

Figure 6:
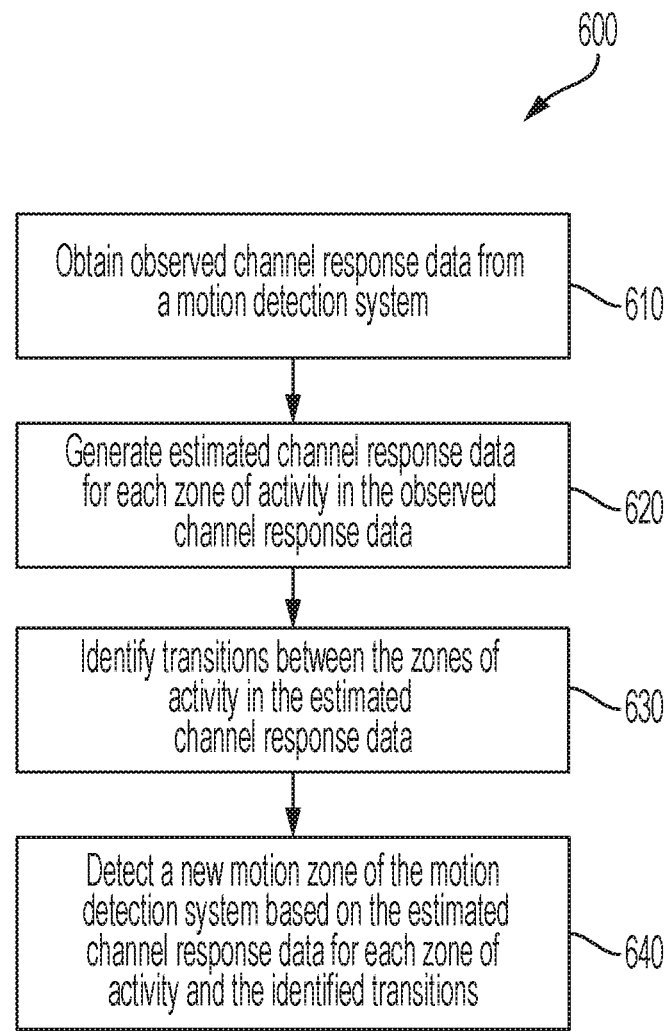
FIG. 6 is a diagram showing a flowchart for identifying new motion zones.

FIG. 6 is a diagram showing a flowchart for identifying new motion zones. The method 600 illustrated in the flowchart may be performed by an offline tuning system (e.g., offline tuning system 110 in FIG. 1) or another type of computer system. In some cases, one or more of the operations shown in FIG. 6 are implemented as processes that include multiple operations, sub-processes or other types of routines. In some cases, operations can be combined, performed in another order, performed in parallel, iterated, or otherwise repeated or performed another manner.

The example method 600 may be performed as part of an adaptive model, e.g., the adaptive model described in FIGS. 3-4. In an implementation, at 610, observed channel response data is obtained from a motion detection system (e.g., channel response data 210 described in FIG. 2). The observed channel response data is based on wireless signals transmitted over a plurality of wireless links in a space (e.g., a home in which the motion detection system 120 is operating, described in FIG. 1). The observed channel response data may be associated with a plurality of subcarriers for each wireless link over a period of time. At 620, estimated channel response data is generated for each of the plurality of subcarriers (e.g., subcarrier 220 described in FIG. 2) for each wireless link for each zone of activity (e.g. distributions 230A, 230B, 230C) in the observed channel response data.

In some instances, a zone of activity corresponds to a segment of a time series of the observed channel response data having a particular distribution (e.g., zone distributions 230A, 230B, 230C described in FIG. 2). In some cases, generating estimated channel response data for each of the plurality of subcarriers for each wireless link for each zone of activity in the observed channel response data comprises generating random data (e.g., the distributions D1 and D2 in FIG. 3) for each of the plurality of subcarriers (e.g., for each subcarrier 220 in FIG. 2) for each wireless link for each zone of activity based on the distribution (e.g., the distribution defined by $\mu_1, \sigma_1$, $\mu_2, \sigma_2$, $\mu_3, \sigma_3$, etc.) of the zone of activity and hyperparameters corresponding to characteristics of the distribution (e.g., hyperparameters h1,h2 in FIG. 3) of the zone of activity. In some instances, the number of zones of activity is a hyperparameter (e.g., N zones described in FIG. 4).

At 630, transitions are identified (e.g., tau as described in the model in FIGS. 3-4) between the zones of activity in the estimated channel response data for each of the plurality of subcarriers for each wireless link. In some instances, a time vector comprises the transitions identified between the zones of activity in the estimated channel response data for each of the plurality of subcarriers for each wireless link and the time of each transition.

At 640, a new motion zone of the motion detection system is detected based on the estimated channel response data for each zone of activity and the identified transitions. In some cases, detecting a new motion zone in the motion detection system includes analyzing the random data (e.g., D1, D2, etc. in FIG. 3) generated for each zone of activity and the transitions identified between each zone of activity (e.g., tau in FIGS. 3-4). In some instances, an active distribution for a given time period is determined (e.g., by switch 330 based on tau as described in FIG. 3). The hyperparameters of each distribution can then be adjusted (e.g., by the Monte Carlo engine 350 in FIG. 3) and the random data is regenerated using the adjusted hyperparameters (the model is adapted as described in FIG. 4).

In some instances of the method 600, it is determined whether the random data correlates to the observed channel response data. In response to determining the random data correlates to the observed channel response data, the offline tuning system may aggregate the identified transitions for each of the plurality of subcarriers for each wireless link, and determine that at least one of the identified transitions indicates a new motion zone (e.g., as described in FIG. 5). In instances in which it is determined that the random data does not correlate to the observed channel response data, the hyperparameters of each distribution may be adapted (e.g., by the Monte Carlo engine described in FIG. 4), and the random data may then be re-generated (e.g., random generator generated distribution data D for each motion zone Z) using the adjusted hyperparameters until the random data correlates to the observed channel response data (as described in the model in FIG. 4).

In some implementations of method 600, a notification is provided to a user of the motion detection system indicating the new motion zone. In response to the notification, a confirmation of the new motion zone or a rejection of the new motion zone is received from the user. In an example, the confirmation of the new motion zone comprises a label for the new motion zone provided by the user. In some instances, a location of the new motion zone is not associated with a location of a particular node of the motion detection system.

Figure 7:
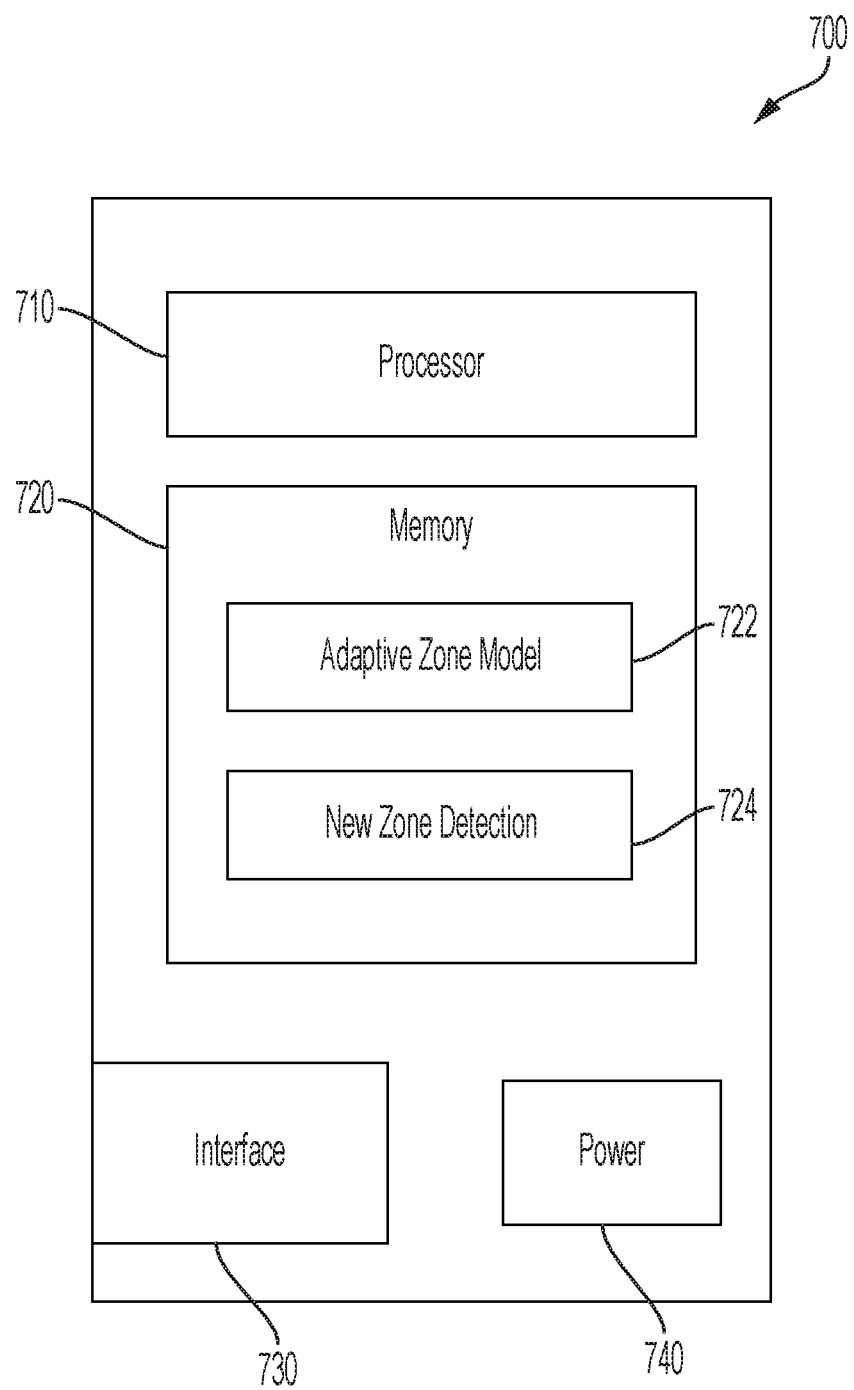
FIG. 7 is a block diagram showing an example external sensor device.

FIG. 7 is a block diagram showing an example offline tuning device 700. The offline tuning device 700 may be configured as offline tuning system 110 described in FIG. 1. As shown in FIG. 7, the example device 700 includes an interface 730, a processor 710, a memory 720, and a power unit 740. In some implementations, the interface 730, processor 710, memory 720, and power unit 740 of the offline tuning device are housed together in a common housing or other assembly. In some implementations, one or more of the components of the offline tuning device can be housed separately, for example, in a separate housing or other assembly.

The example interface 730 can communicate (receive, transmit, or both) signals, e.g., from a motion detection system 120. For example, the interface 730 may be configured to receive data wirelessly, for example, radio frequency (RF) signals formatted according to a wireless communication standard (e.g., Wi-Fi or Bluetooth). In some cases, the interface 730 may be configured to transmit signals, e.g., to transfer data to a system, server or other device. In some implementations, the interface 730 may be configured to receive and transmit data via wired connections (e.g., via Ethernet, etc.). The interface 730 may be implemented as the example interface 730 shown, or may be implemented in another manner, for example, with other types of components or subsystems. In some implementations, the interface 730 is configured to receive or obtain observed channel response data from a motion detection system. The interface 730 may also be configured to transmit or provide data to other systems or devices, such as a motion detection system 120, a machine learning system 160, or a user device 140.

The example processor 710 can execute instructions, for example, to generate output data based on data inputs. The instructions can include programs, codes, scripts, modules, or other types of data stored in memory 720. Additionally or alternatively, the instructions can be encoded as pre-programmed or re-programmable logic circuits, logic gates, or other types of hardware or firmware components or modules. The processor 710 may be or include a general-purpose microprocessor, as a specialized co-processor or another type of data processing apparatus. In some cases, the processor 710 performs high level operation of the device 700. For example, the processor 710 may be configured to execute or interpret software, scripts, modules, programs, functions, executables, or other instructions stored in the memory 720. In some instances, processor 710 may be configured to execute instructions for performing steps of method 600 causing the offline tuning system to detect new motion zones of a motion detection system, e.g., as described in FIG. 6.

The example memory 720 may include computer-readable storage media, for example, a volatile memory device, a non-volatile memory device, or both. The memory 720 may include one or more read-only memory devices, random-access memory devices, buffer memory devices, or a combination of these and other types of memory devices. In some instances, one or more components of the memory can be integrated or otherwise associated with another component of the wireless communication device 700. The memory 720 may store instructions that are executable by the processor 710. For example, the instructions may include instructions for obtaining observed channel response data from a motion detection system. The instructions may further include instructions for generating estimated channel response data for each zone of activity in the observed channel response data, identifying transitions between the zones of activity in the estimated channel response data, and detecting a new motion zone of the motion detection system based on the estimated channel response data for each zone of activity and the identified transitions, such as through one or more of the operations as described in FIGS. 3-5 or in the example process 600 shown in FIG. 6. In some instances, the memory 720 may include one or more instruction sets or modules, for example, to perform adaptive zone modeling 722 and/or detect new motion zones 724, comprising the instructions described above.

The example power unit 740 provides power to the other components of the offline tuning device 700. For example, the other components may operate based on electrical power provided by the power unit 740 through a voltage bus or other connection. In some implementations, the power unit 740 includes a battery or a battery system, for example, a rechargeable battery. In some implementations, the power unit 740 includes an adapter (e.g., an AC adapter) that receives an external power signal (from an external source) and coverts the external power signal to an internal power signal conditioned for a component of the external sensor device 700. The power unit 740 may include other components or operate in another manner.

Some of the subject matter and operations described in this specification can be implemented in digital electronic circuitry, or in computer software, modules, firmware, or hardware, including the structures disclosed in this specification and their structural equivalents, or in combinations of one or more of them, e.g., as described for offline tuning device 700. Some of the subject matter described in this specification can be implemented as one or more computer programs, i.e., one or more modules of computer program instructions, encoded on a computer-readable storage medium for execution by, or to control the operation of, a data-processing apparatus. A computer-readable storage medium can be, or can be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially generated propagated signal. The computer-readable storage medium can also be, or be included in, one or more separate physical components or media (e.g., multiple CDs, disks, or other storage devices). The computer-readable storage medium can include multiple computer-readable storage devices. The computer-readable storage devices may be co-located (instructions stored in a single storage device), or located in different locations (e.g., instructions stored in distributed locations).

A computer program (also known as a program, software, modules, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semi-conductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of some of the examples described, new motion zones are detected in a motion detection system.

In a first example, observed channel response data from a motion detection system is obtained. The observed channel response data is based on wireless signals transmitted over a plurality of wireless links in a space, and the observed channel response data is associated with a plurality of subcarriers for each wireless link over a period of time. Estimated channel response data is generated for each of the plurality of subcarriers for each wireless link for each zone of activity in the observed channel response data. In some instances, transitions are identified between the zones of activity in the estimated channel response data for each of the plurality of subcarriers for each wireless link. In some cases, a new motion zone of the motion detection system is detected based on the estimated channel response data for each zone of activity and the identified transitions.

Implementations of the first example may, in some cases, include one or more of the following features. A zone of activity corresponds to a segment of a time series of the observed channel response data having a particular distribution, and generating estimated channel response data for each of the plurality of subcarriers for each wireless link for each zone of activity in the observed channel response data includes generating random data for each of the plurality of subcarriers for each wireless link for each zone of activity based on the distribution of the zone of activity and hyper-parameters corresponding to characteristics of the distribution of the zone of activity. Detecting a new zone of activity in the motion detection system based on the estimated channel response data for each zone of activity and the identified transitions includes: analyzing the random data generated for each zone of activity and the transitions identified between each zone, determining an active distribution, adjusting the hyperparameters of each distribution and re-generating the random data using the adjusted hyperparameters, determining whether the random data correlates to the observed channel response data, and in response to determining the random data correlates to the observed channel response data, aggregating the identified transitions for each of the plurality of subcarriers for each wireless link, and determining at least one of the identified transitions indicates a new motion zone.

Implementations of the first example may, in some cases, further include one or more of the following features. In response to determining the random data does not correlate to the observed channel response data, adjusting the hyperparameters of each distribution and re-generating the random data using the adjusted hyperparameters until the random data correlates to the observed channel response data. A time vector comprises the transitions identified between the zones of activity in the estimated channel response data for each of the plurality of subcarriers for each wireless link and the time of each transition. The number of zones of activity is a hyperparameter. Providing a notification to a user of the motion detection system indicating the new motion zone, and in response to the notification, receiving, from the user, a confirmation of the new motion zone or a rejection of the new motion zone. The confirmation of the new motion zone includes a label for the new motion zone provided by the user. A location of the new motion zone is not associated with a location particular node of the motion detection system.

In some implementations, a computer-readable medium stores instructions that are operable when executed by a data processing apparatus to perform one or more operations of the first example. In some implementations, a system (e.g., a communication device, computer system, a combination thereof) includes one or more processors and memory storing instructions that are operable when executed by the one or more processors to perform one or more operations of the first example.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub combination.

A number of embodiments have been described. Nevertheless, it will be understood that various modifications can be made. Accordingly, other embodiments are within the scope of the following claims.

What is claimed is:

1. A method comprising:
    obtaining observed channel response data from a motion detection system, the observed channel response data based on wireless signals transmitted over a plurality of wireless links in a space, the observed channel response data associated with a plurality of subcarriers for each wireless link over a period of time;
    generating estimated channel response data for each of the plurality of subcarriers for each wireless link;
    identifying transitions between zones of activity in the estimated channel response data for each of the plurality of subcarriers for each wireless link;
    detecting a new motion zone of the motion detection system based on the estimated channel response data and the identified transitions; and
    adjusting a number of motion zones in an adaptive model, wherein the number of motion zones is a hyperparameter of the adaptive model.

2. The method of claim 1, wherein each zone of activity corresponds to a segment of a time series of the observed channel response data, and
    wherein generating estimated channel response data for each of the plurality of subcarriers for each wireless link comprises generating random data for each of the plurality of subcarriers for each wireless link based on distributions for the zones of activity and hyperparameters corresponding to characteristics of each distribution.

3. The method of claim 2, wherein detecting a new motion zone based on the estimated channel response data and the identified transitions comprises:
    analyzing the random data and the transitions identified between each zone of activity;
    adjusting the hyperparameters corresponding to characteristics of each distribution and re-generating the random data using the adjusted hyperparameters;
    determining whether the random data correlates to the observed channel response data;
    in response to determining the random data correlates to the observed channel response data, aggregating the identified transitions for each of the plurality of subcarriers for each wireless link; and
    determining at least one of the identified transitions indicates a new motion zone.

4. The method of claim 3, comprising, in response to determining the random data does not correlate to the observed channel response data, adjusting the hyperparameters corresponding to characteristics of each distribution and re-generating the random data using the adjusted hyperparameters until the random data correlates to the observed channel response data.

5. The method of claim 3, comprising generating a time vector that indicates the transitions identified between the zones of activity in the estimated channel response data for each of the plurality of subcarriers for each wireless link.

6. The method of claim 1, comprising:
    providing, to a user device associated with the motion detection system, a notification indicating the new motion zone; and
    in response to the notification, receiving, from the user device, a confirmation of the new motion zone or a rejection of the new motion zone.

7. The method of claim 6, wherein the confirmation of the new motion zone comprises a label for the new motion zone provided by a user.

8. The method of claim 1, wherein a location of the new motion zone is not associated with any particular node of the motion detection system.

9. A computer system comprising:
    one or more processors; and
    memory comprising instructions which, when executed by the one or more processors, cause the computer system to perform operations comprising:
        obtaining observed channel response data from a motion detection system, the observed channel response data based on wireless signals transmitted over a plurality of wireless links in a space, the observed channel response data associated with a plurality of subcarriers for each wireless link over a period of time;

generating estimated channel response data for each of the plurality of subcarriers for each wireless link;

identifying transitions between zones of activity in the estimated channel response data for each of the plurality of subcarriers for each wireless link;

detecting a new motion zone of the motion detection system based on the estimated channel response data and the identified transitions; and adjusting a number of motion zones in an adaptive model, wherein the number of motion zones is a hyperparameter of the adaptive model.

10. The computer system of claim 9, wherein each zone of activity corresponds to a segment of a time series of the observed channel response data, and wherein generating estimated channel response data for each of the plurality of subcarriers comprises generating random data for each of the plurality of subcarriers for each wireless link based on distribution for the zones of activity and hyperparameters corresponding to characteristics of each distribution.

11. The computer system of claim 10, wherein detecting a new motion zone based on the estimated channel response data and the identified transitions comprises:

analyzing the random data and the transitions identified between each zone of activity;

adjusting the hyperparameters corresponding to characteristics of each distribution and re-generating the random data using the adjusted hyperparameters;

determining whether the random data correlates to the observed channel response data;

in response to determining the random data correlates to the observed channel response data, aggregating the identified transitions for each of the plurality of subcarriers for each wireless link; and determining at least one of the identified transitions indicates a new motion zone.

12. The computer system of claim 11, the operations comprising, in response to determining the random data does not correlate to the observed channel response data, adjusting the hyperparameters corresponding to characteristics of each distribution and re-generating the random data using the adjusted hyperparameters until the random data correlates to the observed channel response data.

13. The computer system of claim 11, the operations comprising generating a time vector that indicates the transitions identified between the zones of activity in the estimated channel response data for each of the plurality of subcarriers for each wireless link.

14. The computer system of claim 9, the operations comprising:

providing, to a user device associated with the motion detection system, a notification indicating the new motion zone; and in response to the notification, receiving, from the user device, a confirmation of the new motion zone or a rejection of the new motion zone.

15. The computer system of claim 14, wherein the confirmation of the new motion zone comprises a label for the new motion zone provided by a user.

16. The computer system of claim 9, wherein a location of the new motion zone is not associated with any particular node of the motion detection system.

17. A non-transitory computer-readable medium comprising instructions that, when executed by data processing apparatus, cause the data processing apparatus to perform operations comprising:

obtaining observed channel response data from a motion detection system, the observed channel response data based on wireless signals transmitted over a plurality of wireless links in a space, the observed channel response data associated with a plurality of subcarriers for each wireless link over a period of time;

generating estimated channel response data for each of the plurality of subcarriers for each wireless link;

identifying transitions between zones of activity in the estimated channel response data for each of the plurality of subcarriers for each wireless link;

detecting a new motion zone of the motion detection system based on the estimated channel response data and the identified transitions; and adjusting a number of motion zones in an adaptive model, wherein the number of motion zones is a hyperparameter of the adaptive model.

18. The non-transitory computer-readable medium of claim 17, wherein each zone of activity corresponds to a segment of a time series of the observed channel response data, and wherein generating estimated channel response data for each of the plurality of subcarriers for each wireless link comprises generating random data for each of the plurality of subcarriers for each wireless link based on distributions for the zones of activity and hyperparameters corresponding to characteristics of each distribution.

19. The non-transitory computer-readable medium of claim 18, wherein detecting a new motion zone based on the estimated channel response data and the identified transitions comprises:

analyzing the random data and the transitions identified between each zone of activity;

adjusting the corresponding to characteristics hyperparameters of each distribution and re-generating the random data using the adjusted hyperparameters;

determining whether the random data correlates to the observed channel response data;

in response to determining the random data correlates to the observed channel response data, aggregating the identified transitions for each of the plurality of subcarriers for each wireless link; and determining at least one of the identified transitions indicates a new motion zone.

20. The non-transitory computer-readable medium of claim 19, the operations comprising in response to determining the random data does not correlate to the observed channel response data, adjusting the hyperparameters corresponding to characteristics of each distribution and re-generating the random data using the adjusted hyperparameters until the random data correlates to the observed channel response data.

21. The non-transitory computer-readable medium of claim 19, the operations comprising generating a time vector that indicates the transitions identified between the zones of activity in the estimated channel response data for each of the plurality of subcarriers for each wireless link.

22. The non-transitory computer-readable medium of claim 17, the operations further comprising:

providing, to a user device associated with the motion detection system, a notification indicating the new motion zone; and in response to the notification, receiving, from the user device, a confirmation of the new motion zone or a rejection of the new motion zone.

23. The non-transitory computer-readable medium of claim 22, wherein the confirmation of the new motion zone comprises a label for the new motion zone provided by a user.

24. The non-transitory computer-readable medium of claim 17, wherein a location of the new motion zone is not associated with any particular node of the motion detection system.

\* \* \* \* \*

UNITED STATES PATENT AND TRADEMARK OFFICE
CERTIFICATE OF CORRECTION

PATENT NO. : 10,565,860 B1
APPLICATION NO. : 16/360250
DATED : February 18, 2020
INVENTOR(S) : Omer et al.

Page 1 of 1

It is certified that error appears in the above-identified patent and that said Letters Patent is hereby corrected as shown below:

In the Drawings

In FIG. 4, delete "310" and insert -- 410 -- therefor.

In the Specification

Column 2, Line 47, delete "assembly)," and insert -- assembly, -- therefor.

Column 5, Line 66, delete "a)" and insert -- σ) -- therefor.

Column 6, Line 16, delete "a)" and insert -- σ) -- therefor.

Column 10, Line 36, delete "220" and insert -- 215 -- therefor.

Column 10, Line 48, delete "220" and insert -- 215 -- therefor.

Column 10, Line 52, delete "h1 ,h2" and insert -- h1, h2 -- therefor.

Column 11, Line 8, delete "350" and insert -- 380 -- therefor.

Column 15, Line 53, delete "sub combination." and insert -- subcombination. -- therefor.

Signed and Sealed this
Seventh Day of April, 2020

Andrei Iancu
*Director of the United States Patent and Trademark Office*